(12) United States Patent
Vadavia (10) Patent No.: US 7,464,095 B2
(45) Date of Patent: Dec. 9, 2008

(54) ADAPTIVE DATA ARCHITECTURE FOR INFORMATION MANAGEMENT SYSTEMS

(76) Inventor: Rajesh Vadavia, 805, Robert Street, Brossard, Quebec (CA) J4X 1C8

( * ) Notice: Subject to any disclaimer, the term of this patent is extended or adjusted under 35 U.S.C. 154(b) by 520 days.

(21) Appl. No.: 10/193,161

(22) Filed: Jul. 12, 2002

(65) Prior Publication Data

US 2003/0097545 A1     May 22, 2003

(30) Foreign Application Priority Data

Jul. 13, 2001     (CA) .................................. 2353026

(51) Int. Cl.
*G06F 17/30*     (2006.01)
(52) U.S. Cl. ........................ 707/100; 707/3; 707/103 R
(58) Field of Classification Search .................. 707/10, 707/100, 200, 103 R, 103 X, 103 Y, 104.1, 707/101–103
See application file for complete search history.

(56) References Cited

U.S. PATENT DOCUMENTS

| | | | | |
|---|---|---|---|---|
| 5,706,506 | A * | 1/1998 | Jensen et al. | 707/103 R |
| 5,752,018 | A | 5/1998 | Sheffield | 707/2 |
| 5,826,259 | A | 10/1998 | Doktor | 707/4 |
| 5,873,093 | A * | 2/1999 | Williamson et al. | 707/103 R |
| 5,915,254 | A | 6/1999 | Nakayama et al. | 707/203 |
| 5,930,795 | A | 7/1999 | Chen et al. | 707/100 |
| 6,122,641 | A * | 9/2000 | Williamson et al. | 707/103 R |
| 6,157,928 | A | 12/2000 | Sprenger et al. | 707/103 R |
| 6,189,012 | B1 | 2/2001 | Mital et al. | 707/103 R |
| 6,219,662 | B1 | 4/2001 | Fuh et al. | 703/3 |
| 6,253,196 | B1 | 6/2001 | Fuh et al. | 707/3 |
| 6,317,748 | B1 * | 11/2001 | Menzies et al. | 707/103 X |
| 6,363,388 | B1 * | 3/2002 | Sprenger et al. | 707/10 |
| 6,385,618 | B1 * | 5/2002 | Ng et al. | 707/103 Y |
| 6,418,451 | B1 * | 7/2002 | Maimone | 707/200 |
| 6,470,354 | B1 * | 10/2002 | Aldridge et al. | 707/103 Y |
| 6,529,914 | B1 * | 3/2003 | Doan et al. | 707/103 Y |
| 6,535,887 | B1 * | 3/2003 | Komine et al. | 707/103 Y |

(Continued)

FOREIGN PATENT DOCUMENTS

CA     2186140     9/1995

(Continued)

OTHER PUBLICATIONS

Conceptual, Logical, and Physical Data Models; http://www.1keydata.com/datawarehousing/data-modeling-levels.html, printed Sep. 23, 2005.*

(Continued)

*Primary Examiner*—Cam Y T Truong (57) ABSTRACT

A data architecture for an information management system for storing and retrieving data, where the system is characterized by a set of data processing rules. The data architecture includes a database management system implementing a primary data structure including a plurality of data elements for storing data, the primary data structure being characterized by a fixed data schema. The database management system also implements a secondary data structure defining a plurality of data relationships between the data elements of the primary data structure on a basis of the data processing rules of the information management system. Accordingly, the primary data structure is independent of the data processing rules of the information management system, such that the primary data structure is unaffected by changes to the data processing rules of the information management system.

4 Claims, 9 Drawing Sheets

U.S. PATENT DOCUMENTS

| | | | |
|---|---|---|---|
| 2002/0023091 A1* | 2/2002 | Silberberg et al. | 707/103 Y |
| 2002/0091702 A1* | 7/2002 | Mullins | 707/100 |
| 2002/0107870 A1* | 8/2002 | Yen et al. | 707/104.1 |
| 2003/0097363 A1* | 5/2003 | Dorsey | 707/100 |

FOREIGN PATENT DOCUMENTS

| | | |
|---|---|---|
| EP | 1 081 609 A2 | 3/2001 |
| WO | WO 02/059793 A2 | 8/2002 |

OTHER PUBLICATIONS

Arnold-Moore T et al: "Architecture of a content management server for XML document applications" Web Information Systems Engineering, 2000. Proceedings of the First International Conference on Hong Kong, China Jun. 19-21, 2000, Los Alamitos, CA, USA, IEEE Comput. Soc, US, Jun. 19, 2000, pp. 97-108, XP010521842.

Petrou C et al: "An XML-based, 3-tier scheme for integrating heterogeneous information sources to the WWW" Database and Expert Sytems Applications, 1999. Proceedings. Tenth International Workshop on Florence, Italy Sep. 1-3, 1999, Los Alamitos, CA, USA, IEEE Comput. Soc, US, Sep. 1, 1999, pp. 706-710, XP010352389.

International Search Report, PCT/CA03/00012, Oct. 15, 2003.

* cited by examiner

| Object Class | Property Class |
|---|---|
| Customer | Name |
| | Last Name |
| | First Name |

| Object Class | Property Class |
|---|---|
| Employ | Name |
| | Last Name |
| | First Name |
| | Log Name |
| | Password |

| Object Class | Property Class |
|---|---|
| P-Address | Addr1 |
| | Addr2 |
| | City |

| Object Class | Property Class |
|---|---|
| E-Address | Email-Address |
| | Cell Number |
| | First Name |

FIG. 6

| Object Class | Object Instance Class | Property Class | Property Values |
|---|---|---|---|
| Customer | Cust1 | Name | |
| | | Last Name | |
| | | First Name | |
| | Cust2 | Name | |
| | | Last Name | |
| | | First Name | |
| | Cust3 | Name | |
| | | Last Name | |
| | | First Name | |
| | Cust4 | Name | |
| | | Last Name | |
| | | First Name | |
| | Cust5 | Name | |
| | | Last Name | |
| | | First Name | |
| Employ | Emp1 | Name | |
| | | Last Name | |
| | | First Name | |
| | | Log Name | |
| | | Password | |
| | Emp2 | Name | |
| | | Last Name | |
| | | First Name | |
| | | Log Name | |
| | | Password | |
| | Emp3 | Name | |
| | | Last Name | |
| | | First Name | |
| | | Log Name | |
| | | Password | |

ADAPTIVE DATA ARCHITECTURE FOR INFORMATION MANAGEMENT SYSTEMS

FIELD OF THE INVENTION

The invention relates to the field of information management systems. More specifically, the invention is directed to an adaptive data architecture for information management systems using database management systems (DBMS).

BACKGROUND OF THE INVENTION

The traditional approach to the design of information management systems using relational databases typically progresses through five mutually exclusive stages:
 define business requirements;
 design table structure (data schema);
 program tables and store procedures;
 program application and interface;
 test and deploy system.

The overall timeframe for application development is dependent on sequentially completing each stage and then moving on to the next. For example, all of the business requirements must be completely defined before the structure of the database tables and fields, as well as their relationships, can be designed. Similarly, the table structure must be completed before the access routines can be written. Based on the completed data schema and procedures, the software programmers then start to develop the business modules and corresponding user interfaces.

The traditional approach can take considerable time. Making changes to a previously completed stage turns into a time consuming process requiring the developers to go "back to the drawing board" and re-work what was already completed. The design phase is most critical because fundamental decisions are made about the general use, purpose and shape of the application. If this foundation work is flawed, it is extremely difficult and expensive to correct later. If there are design weaknesses, the entire process has to be backed up and repeated.

Conventional relational database management systems (RDBMS) are typically built using a fixed data architecture, where this fixed data architecture consists in fixed data structures such as data fields, memo fields, records, spreadsheets, data files, indexes and relationships. Specifically, a data model, including a fixed physical data structure and data access routines, is designed and implemented based on predetermined business rules and requirements known at the time of design. This data model often determines the success or failure of the resulting application. Unfortunately, once completed, changes to this data model in order to implement new requirements are very difficult, due to limitations imposed by the fixed data structure and the dependence of the data model thereon, such that both the data structures and the business rules become locked in to each other.

Consequently, the life span of the traditional information management system is relatively short, as the completed data model rapidly becomes obsolete in the face of new and evolving business requirements. The fixed data architecture limits the growth of the system, as the overall system is unable to evolve to address future business needs and requirements.

Furthermore, relational database management systems often have difficulty integrating with modern object-oriented application development, which introduces objects defined by dynamic templates that are able to adapt and change according to the needs of the application. This is due to the fact that the fixed data structure of the conventional relational database management system originated at a time when business requirements were known well in advance of the system design and were not expected to change once systems were designed and deployed. Thus, the fixed data structure used by relational database management systems is a severe bottleneck in the development, life cycle and flexibility of any data-centric software solution.

A common solution to the limitations of the existing RDBMS engines is the regular re-working of the fixed data architecture, time and time again, in order to implement new business processes. When unforeseen applications require access to the data schema previously developed for an existing RDBMS, another possible solution is the development of separate databases that run independently from the original database, even though some data may be duplicated in both the original and new databases. Such solutions are expensive, time consuming and extremely inefficient.

Against this background, a need exists in the industry for an improved data architecture for information management systems using conventional DBMS engines.

SUMMARY OF THE INVENTION

According to a broad aspect, the invention provides a data architecture for an information management system for storing and retrieving data, where the system is characterized by a set of data processing rules. The data architecture includes a database management system implementing a primary data structure including a plurality of data elements for storing data, the primary data structure being characterized by a fixed data schema. The database management system further implements a secondary data structure defining a plurality of data relationships between the data elements of the primary data structure on a basis of the data processing rules of the information management system, whereby the primary data structure is independent of the data processing rules of the information management system.

Advantageously, this novel data architecture improves the flexibility and functionality of the information management system, which is used for the storage and retrieval of information. The data architecture allows for the separation of the fixed primary data structure from the data processing rules of the system, such that the system becomes flexible and adaptive to modifications to the data processing rules. More specifically, the actual physical data structure of the information system does not have to be modified when the data processing rules must be changed to implement new requirements.

In a specific, non-limiting example of implementation, the novel data architecture is applied to an N-tier client/server information management system, which is operative to store and retrieve information for implementing different business applications.

The information management system includes an N-tier application layer and an N-tier data management layer. The data management layer includes a plurality of database management systems. Each database management system implements a primary data structure including a plurality of data elements for storing data, where the primary data structure is characterized by a fixed data schema. In other words, the primary data structure is a physical data structure in which the physical layout of the stored data is fixed.

Examples of such database management systems include relational database management systems (RDBMS), hierarchal database management systems and XML database management systems, among other possibilities.

The application layer of the information management system is characterized by at least one set of data processing rules, also referred to as business rules or business logic. A data processing rule is a directive, policy or procedure, either established within an organization or by an outside source, which defines information and/or information relationships that must be supported by the system. Each set of rules is associated with the processes and functions of a particular business application implemented by the information management system, and guides the data processing performed b the systems under this particular business application.

The application layer of the information management system also includes a plurality of different client application user interfaces, each user interface being associated with a respective set of data processing rules, and thus with a respective business application. Each user interface is operative to present information to a system user, to prompt the user for input and to obtain data from the user.

Specific to the present invention, the database management system also implements a secondary data structure. For each business application, the secondary data structure defines a plurality of data relationships between the data elements stored in the primary data structure, where these data relationships are established on the basis of the corresponding set of data processing rules. Accordingly, the primary data structure of the database management system is completely independent of the data processing rules.

The secondary data structure is a logical data structure defined by a particular organization of the data elements of the primary data structure, and characterized by a dynamically variable data model. This logical data structure is compatible with the application layer, and the primary data structure acts simply as an interface for channeling or exchanging data between the logical data structure and the application layer.

A data access module allows for data stored to be exchanged between the database management system and the application layer. The data access module includes a primary data access unit and a secondary data access unit. The primary data access unit is responsible for exchanging data with the database management system, and generates primary data instructions for transmission to the database management system. The database management system is responsive to these primary data instructions to modify the data elements of the respective primary data structure.

The secondary data access unit is operative to communicate and exchange data with the application layer of the system. More specifically, the secondary data access unit generates secondary data instructions on a basis of the data processing rules of the application layer, each secondary data instruction being indicative of a modification to be made to at least one of the data relationships defined by the secondary data structure.

The primary data access unit is responsive to a secondary data instruction generated by the secondary data access unit to convert the secondary data instruction into a primary data instruction for transmission to the database to the database management system. Various different algorithms and techniques may be implemented by the primary data access unit to convert secondary data instructions into primary data instructions.

According to another broad aspect, the invention provides an information management system for storing and retrieving data. The information management system includes an application layer characterized by a set of data processing rules, as well as a data management layer. The data management layer includes at least one database management system implementing a primary data structure including a plurality of data elements for storing data, where this primary data structure is characterized by a fixed data schema. The database management system also implements a secondary data structure operative to define a plurality of data relationships between the data elements of the primary data structure on a basis of the data processing rules of the information management system, whereby the primary data structure is independent of the data processing rules of the information management system.

According to another broad aspect, the invention provides a computer readable storage medium containing a program element for execution by at least one computer including a processor and a memory for implementing in the memory of the at least one computer an information management system. The information management system includes at least one database management system implementing a primary data structure including a plurality of data elements for storing data, where this primary data structure is characterized by a fixed data schema. The database management system also implements a secondary data structure operative to define a plurality of data relationships between the data elements of the primary data structure on a basis of the data processing rules of the information management system, whereby the primary data structure is independent of the data processing rules of the information management system.

BRIEF DESCRIPTION OF THE DRAWINGS

These and other features of the present invention will become apparent from the following detailed description considered in connection with the accompanying drawings, of which.

In the drawings, embodiments of the invention are illustrated by way of example. It is to be expressly understood, however, that the drawings are provided only for purposes of illustration and as an aid to understanding, and are not intended to be a definition of the limits of the invention, for which reference should be made to the appending claims.

DETAILED DESCRIPTION

Figure 1:
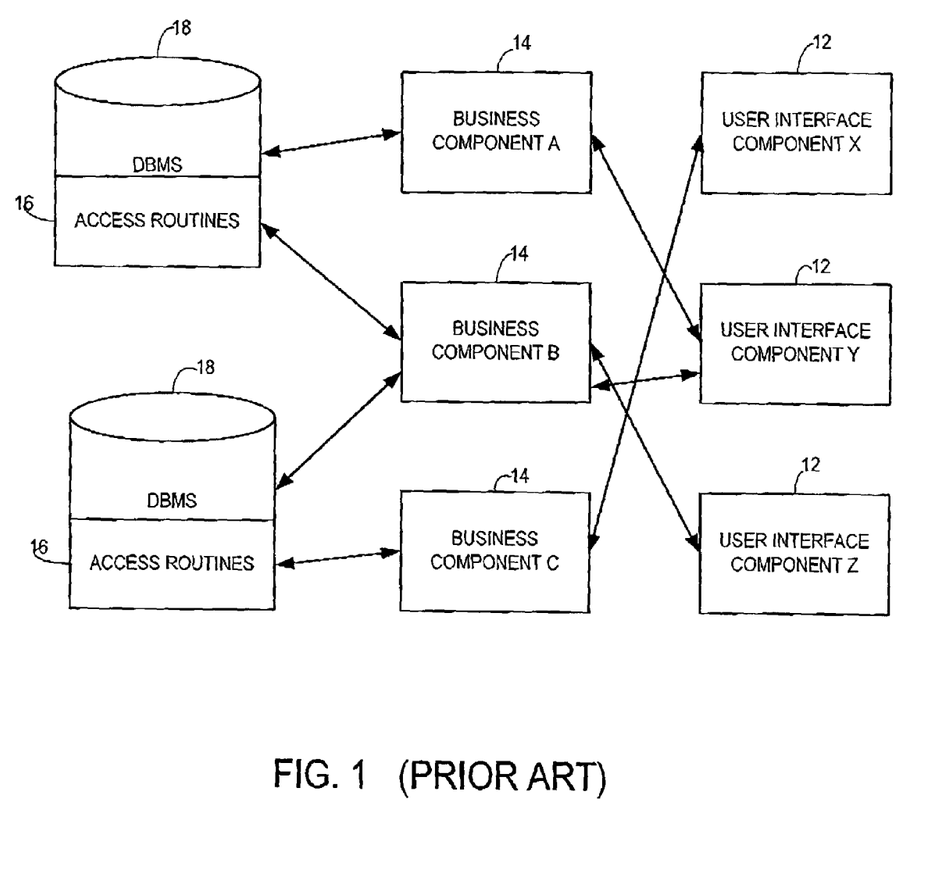
FIG. 1 illustrates a commonly used front end N-tier client/server architecture for an information management system.

FIG. 1 illustrates a typical front end N-tier client/server architecture for an information management system, in this example a Relational DataBase Management System (RDBMS) capable to implement different business applications, for example a storage bank of customer and employee information. The system 10 includes three main components, notably the user interface components 12, the business components 14 and the DataBase Management System (DBMS) 18.

Each user interface component 12 contains input/output rules, and is used to present information to the system user and to obtain input from the user. The user interface component 12 implements presentation logic that provides menus of display options that allow the user to navigate through the different parts of the business application and, in addition, allow for the manipulation of input and output fields through a display device, such as a computer terminal.

Each business component 14 contains business data processing rules implementing business logic that governs both the functions and processes of the business application. These functions and processes are invoked by either a user interface component 12 when a user requests an option or by another function or process.

A set of access routines 16 is associated with each DBMS 18 for implementing data access logic that interfaces to database system 18. The data access functions of each data access component 16 are generally invoked by a business function or process of one of the business components 14; however, they may also be invoked directly by a user interface component 12.

Figure 2:
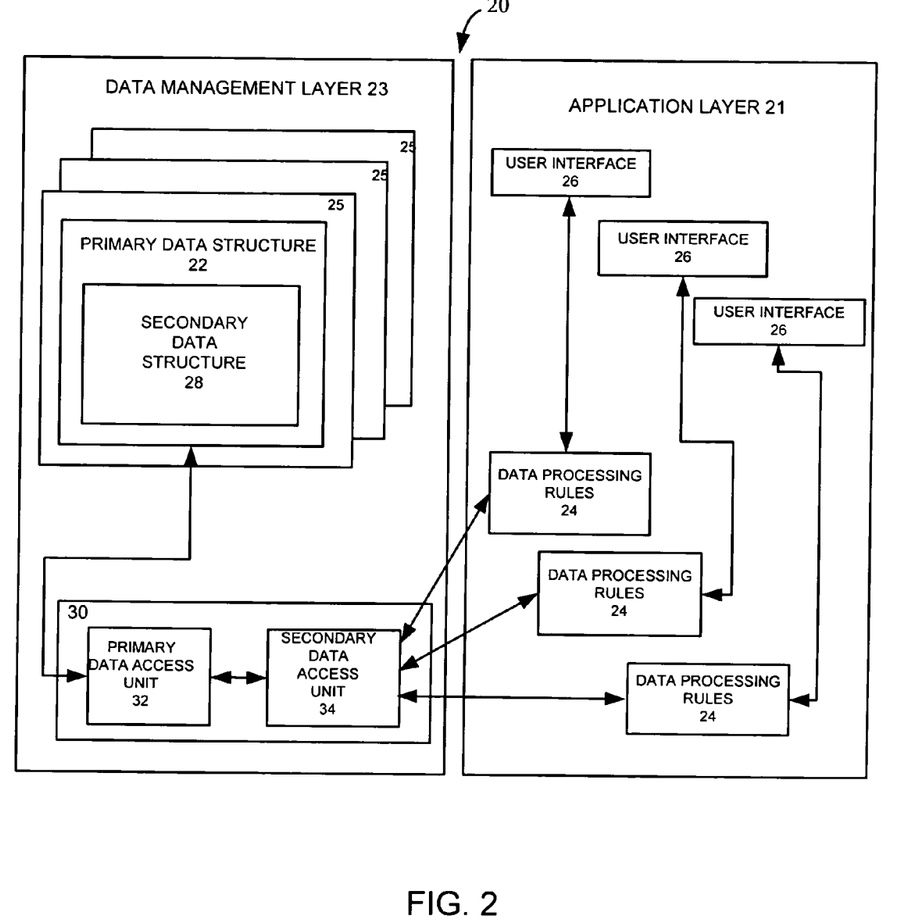
FIG. 2 depicts a functional representation of the front and back end data architecture of an N-tier client/server information management system, according to an example of implementation of the present invention.

FIG. 2 depicts a functional representation of the font and back end data architecture of an N-tier client/server information management system, according to an example of implementation of the present invention. The information management system 20 is operative to store and retrieve information, for implementing different business applications.

The information management system 20 includes an N-tier application layer 21, also referred to as the front end of the system 20, and an N-tier data management layer 23, also referred to as the back end of the system 20.

The data management layer 23 includes a plurality of database management systems 25. Each database management system 25 implements a primary data structure 22 including a plurality of data elements for storing data, where this primary data structure 20 is characterized by a fixed data schema. In other words, the physical layout of the data stored in the primary data structure 22 is a physical data structure in which the physical layout of the stored data is fixed. The data elements of the primary data structure 22 may consist of database tables, data fields of fixed or variable length, records, word processing documents, spreadsheets, data files, database files, indexes, among many other possibilities.

For the purpose of clarification, the following example of implementation will be described in the context of a single database management system 25, although the same implementation may be applied to the plurality of database management systems 25.

Examples of such database management systems include relational database management systems (RDBMS), hierarchical database management systems and XML database management systems, among other possibilities.

In a specific example, the primary data structure 22 includes a database containing a plurality of tables for storing data, where each table includes a fixed number of columns and a dynamically variable number of rows. Although the physical layout of the tables in the primary data structure 22 is fixed, the size, or more specifically, the number of rows in a table of the primary data structure 22 may vary as a result of the type and quantity of data input to the system 20 for storage.

It should be noted that a data element stored in the primary data structure might include textual information and/or binary information.

The application layer 21 of the information management system 20 is characterized by at least one set of data processing rules 24, also referred to as business rules or business logic. A data processing rule is a directive, policy or procedure, either established with an organization or by an outside source, which defines information and/or information relationships that must be supported by the system 20. Examples of business rules established by an outside source include government regulations and membership association guidelines. Each set of rules 24 is associated with the processes and functions of a particular business application implemented by the information management system 20, and guides the operation of the system 20, more specifically the data processing performed by the system 20, under this particular business application.

The application layer 21 of the information management system 20 also includes a plurality of different client application user interfaces 26, each user interface 26 being associated with a respective set of data processing rules 24, and thus with a respective business application. As discussed above in relation to FIG. 1, each user interface 26 is operative to present information to a system user, to prompt the user for input and to obtain data from the user. The functionality and implementation of such a user interface is well known to those skilled in the art, and is not critical to the present invention, such that it will not be described in further detail.

The application layer 21 is implemented in software, and uses an object oriented application development language, such as C++, JAVA or Visual Basic, among other possibilities. The functionality and implementation of the application layer of an information management system is well known to those skilled in the art, and will not be described in further detail.

Specific to the present invention, the information management system 25 also implements a secondary data structure 28. For each business application, the secondary data structure 28 defines a plurality of data relationships between the data elements stored in the primary data structure 22, where these data relationships are established on the basis of the corresponding set of data processing rules 24. Accordingly, the primary data structure 22 of the database management system 25 is completely independent of the data processing rules 24.

Take for example the situation where the business application to be implemented by the information management system 20 is the creation of a database of customer and employee information. In this case, examples of possible data relationships defined by the secondary data structure 28 may include the association of an e-mail address to a customer, the association of an address to a customer, the association of a telephone number to an employee, among many other possibilities.

More specifically, the secondary data structure 28 is a logical data structure defined by a particular organization of the data elements of the primary data structure 22. This logical data structure 28 is compatible with the object-oriented development language of the application layer 21, and the primary data structure 22 acts as an interface for channeling or exchanging data between the logical data structure 28 and the application layer 21. In this way, the primary data structure 22 is itself transparent to the application layer 21, which communicates with the logical data structure 28. Thus, the primary data structure 22 is separate from the data processing rules 24 of the application layer 21 and unaffected by any modifications made to the data processing rules 24.

The secondary data structure 28 is characterized by a variable data model. As is well known to those skilled in the art, a data model says what information is to be contained in a data structure, how the information will be used, and how the items in the data structure will be related to each other. By "dynamically variable" is implied that the secondary data structure 28 is capable to adapt to different quantities and types of information to be stored in the information management system 20. Thus, the creation and modification of the secondary data structure 28 is driven by the actual processing rules 24 of the system 20.

A data access module 30 allows for the data to be exchanged between the database management system 25 and the application layer 21. As shown in FIG. 2, the data access module 30 includes both a primary data access unit 32 and a secondary data access unit 34. The primary data access unit 32 is responsible for exchanging data with the database management system 25, and generates primary data instructions for transmissions to the database management system 25. The database management system 25 is responsive to these primary data instructions to modify the data elements of the respective primary data structure 22.

In a specific example, the primary data instructions generated by the primary data access unit 32 implement the basic data access routines of the information management system 20, notably the Read, Write and Delete routines. The Read routine allows for a data element to be read from the primary data structure 22, while the Write routine allows for a data element to be written to the primary data structure 22. The Delete routine allows for a data element to be removed from the primary data structure 22.

The secondary data access unit 34 is operative to communicate and exchange data with the application layer 21 of the system 20. More specifically, the secondary data access unit 34 generates secondary data instructions on a basis of the data processing rules 24 of application layer 21, each secondary data instruction being indicative of a modification to be made to at least one of the data relationships defined by the secondary data structure 28.

Similarly, the secondary data instructions generated by the secondary data access unit 34 are access routines associated specifically with the secondary data structure 28, in order to create, edit and delete data stored in the dynamic tables of the secondary data structure 28, among other possible processes. For each different business application, and thus for each different set of data processing rules 24, the same set of access routines implemented by the secondary data access unit 34 allows for the customization of the data relationships defined by the secondary data structure 28. The particular set of data access routines implemented by the secondary data access unit 34 will be described in further detail below.

The primary data access unit 32 is responsive to a secondary data instruction generated by the secondary data access unit 34 to convert the secondary data instruction into a primary data instruction for transmission to the database management system 25. Various different algorithms and techniques may be implemented by the primary data access unit 32 to convert secondary data instructions into primary data instructions. Such algorithms and techniques are not critical to the present invention and, as such, will not be described in further detail.

Thus, the separation of the fixed primary data structure 22, which stores the information being managed by the system 20, from the data processing rules 24, which define requirements to be met by the system 20, provide a flexible and adaptive data architecture for the information management system 20. In particular, the use of a dynamically variable secondary data structure 28 within the database management system 25 allows the system 20 to address new business requirements and needs that may arise over time with regard to an existing business application, without having to recreate or modify the primary data structure 22. Furthermore, the design, development and deployment of the information management system 20 can proceed simultaneously, since the data architecture shown in FIG. 2 supports future changes to the business rules and requirements of the system 20. More specifically, the specific details of the primary data structure 22 may be completed, and the data processing rules 24 added and refined, while the development of the system 20 is in progress.

Figure 3:
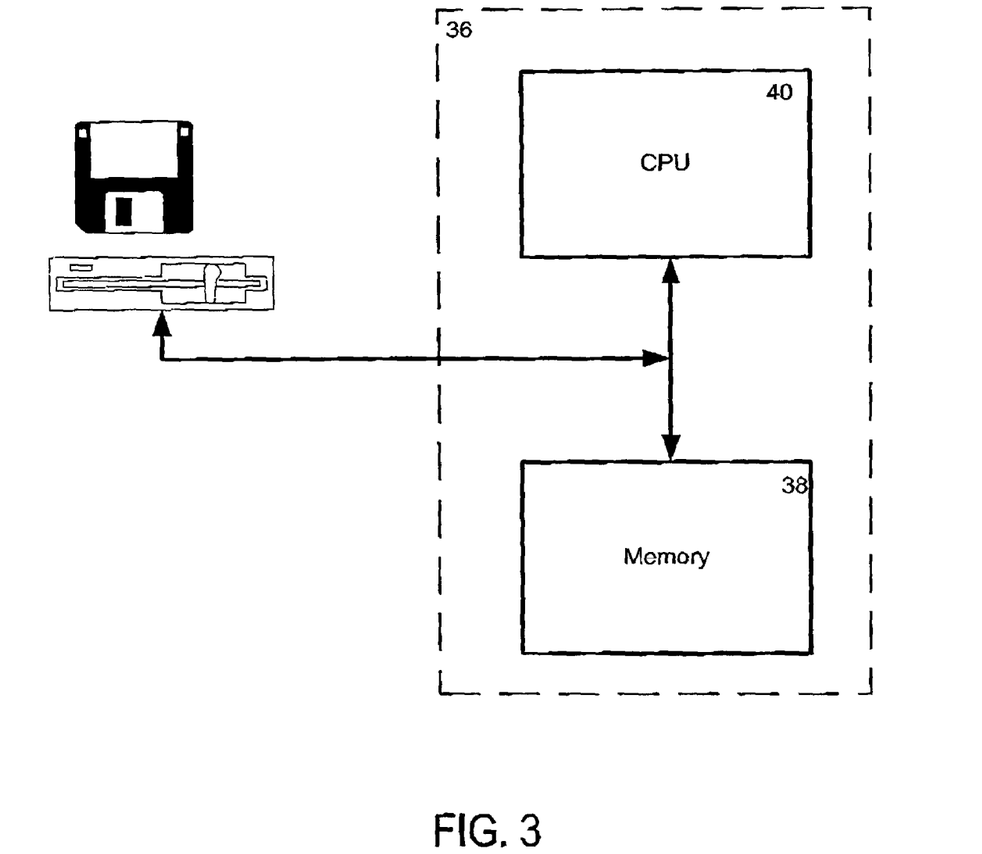
FIG. 3 depicts a functional block diagram of an example of a computing platform implementing at least one component of the information management system shown in FIG. 2.

According to the present example of implementation, each component of the information management system 20, including in particular the data access module 30, the data processing rules 24 and the user interfaces 26, is software implemented on one or more computing platforms, for example a server and several client workstations. FIG. 3 depicts a functional block diagram of one example of a computing platform 36 implementing at least one component of the information management system 20. Assume for example that the computing platform 36 implements the data access module 30 of the information management system 20. The latter is implemented by a program element that is stored in the memory 38, and executed by the controller 40, of the computing device 36. Alternatively, the data access module 30 may be stored on a computer readable medium, such as a floppy disk, that is external to the computing device 36. The floppy disk can be read by a floppy drive to load the program instructions in the memory 38. The computer readable medium may be part of a remote computing platform that is in some way connected to the computing platform that executes the program element for allowing the data transfer necessary to pass the program element to the computing platform on which the execution will take place. For example, a file server containing the program element that can be accessed over any suitable connection by another computing platform to obtain the program element is considered a computer readable medium storing the program element.

Figure 4:
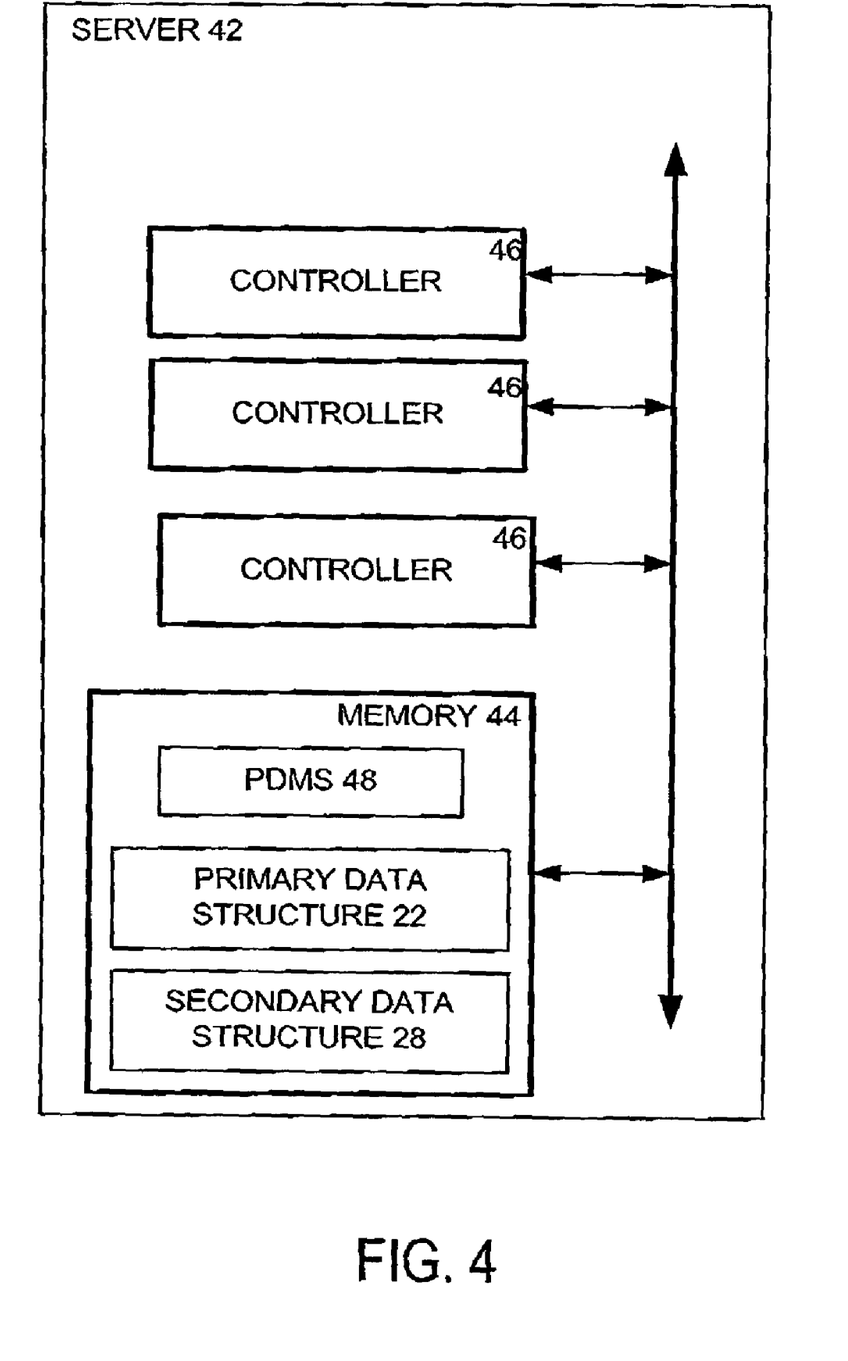
FIG. 4 shows a functional block diagram of an example of a single server implementing the entirety of the information management system shown in FIG. 2.

In another example, FIG. 4 shows a functional block diagram of a single server 42 implementing the entirety of the information management system 20 shown in FIG. 2. In this case, a memory 44 contains a program element that controls the operation of the server 42. That program element is comprised of individual instructions that are executed by various controllers 46. The program element includes several functional blocks that manage several tasks. One of those functional blocks is the Primary Data Management System (PDMS) 48, which provides efficient and effective use and maintenance of the primary data structure 22. For example, in the case where the primary data structure 22 consists of a plurality of relational databases, the PDMS 48 is a Relational Database Management System (RDBMS). The RDBMS will not be described in detail because it is well known to those skilled in the technological field to which the present invention belongs. The primary and secondary data structures 22, 28 are stored in the memory 44, which also provides random access storage, capable of holding data elements such as data packets that the processors manipulate during the execution of the program element.

In the example shown in FIG. 4, primary and secondary data structures 22, 28 are part of the memory 44 of the server 42. Alternatively, either one or both of the primary and secondary data structures 22, 28 may be stored on a separate storage medium, such as non-volatile medium interconnected through a high speed data bus with the memory 44 so the record set from the data structure can be quickly loaded in the random access memory 44 for processing. Alternatively, the collection of data which makes up either one or both of the data structures 22, 28 may be stored remotely on one or a set of physical storage device(s), for instance a disk. In such a case, one of the server's device drivers would be responsible for communicating directly with the peripheral device(s) in order to access the database.

In a specific, non-limiting example of implementation of the present invention, assume that the particular business application to be implemented by the information management system 20 is the creation of a database for storing and retrieving customer and employee information. For this particular business application, the business requirements are:

---

CUSTOMER

For each customer, the following information must be captured:
    Name
    Last Name
    Physical Addresses
        Addr1
        Addr2
        City
    Electronic Addresses
        Email-Address
        Cell Numbers

EMPLOYEE

For each employee, the following information must be captured:
    Name
    Log Name
    Password
    Physical Addresses
        Addr1
        Addr2
        City
        Country
    Electronic Addresses
        Email-Address
        Cell Numbers

---

Further, assume that the information management system 20 is characterized by the following data processing rules 24, also referred to as business rules or business logic:

1. Every time a customer is added to the database, you must have a first name, a last name and a physical address.
2. Every time an employee is added to the database, you must have a first name, a last name and an electronic address.

Assume that the information management system 20 includes an RDBMS engine, whereby the primary data structure 22 is formed of a plurality of relational databases. The fixed data schema of the relational database structure 22 is integrated with a modern, object-oriented development language, such as C++, JAVA or Visual Basic, for implementing the secondary data structure 28. More specifically, the secondary data structure 28 includes object-based tables and the set of data access routines implemented by the secondary data access unit 34 are object-oriented. Typically, under an object-oriented development language, objects are comprised of data (properties) and processes (methods). For example, a "customer" object would be comprised of information (first name, last name, address, password, etc) and specific processes to access or update that information (read methods, write methods, etc). Such object-oriented development languages and techniques are well known to those skilled in the art, and as such will not be discussed in further detail.

The following steps must be followed in order to generate an object-oriented secondary data structure 28:

1. Define required class elements:
    a. Property class(es)
    b. Object class(es)
2. Define methods for:
    a. Property class(es)
    b. Object Class(es)
3. Define a data schema to match the defined classes and properties (table layout of the secondary data structure 28).
4. Write an application programming interface to call all the methods of these classes and properties (data access routines of the secondary data access unit 34).

Continuing with the specific, non-limiting example of implementation of the database of customer and employee information, the following property and object classes are defined:

| Property classes | Object classes |
|---|---|
| Name | Customer |
| Last Name | Employee |
| First Name | P-Address |
| Addr1 | E-Address |
| Addr2 | |
| City | |
| Country | |
| Email-Address | |
| Cell Number | |
| Log Name | |
| Password | |

Figure 5A:
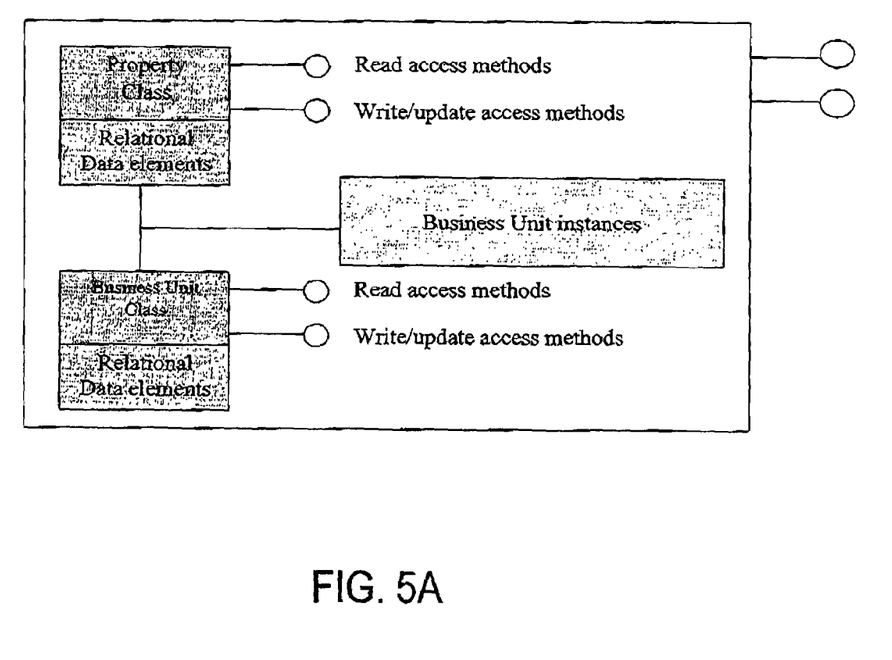
FIGS. 5A, 5B and 5C illustrate the secondary data structure of the information management system shown in FIG. 2, according to a specific, non-limiting example of implementation.
Figure 5B:
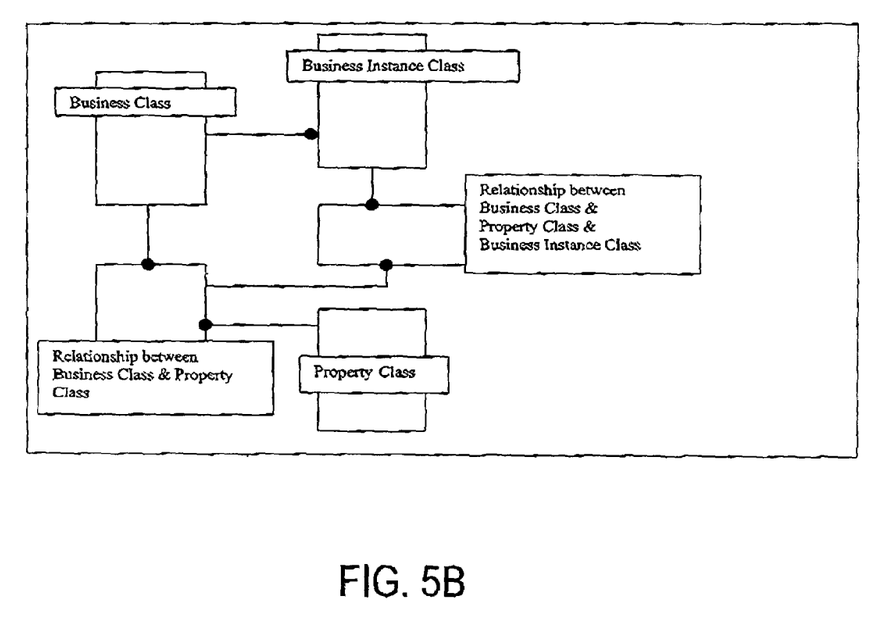
Figure 5C:
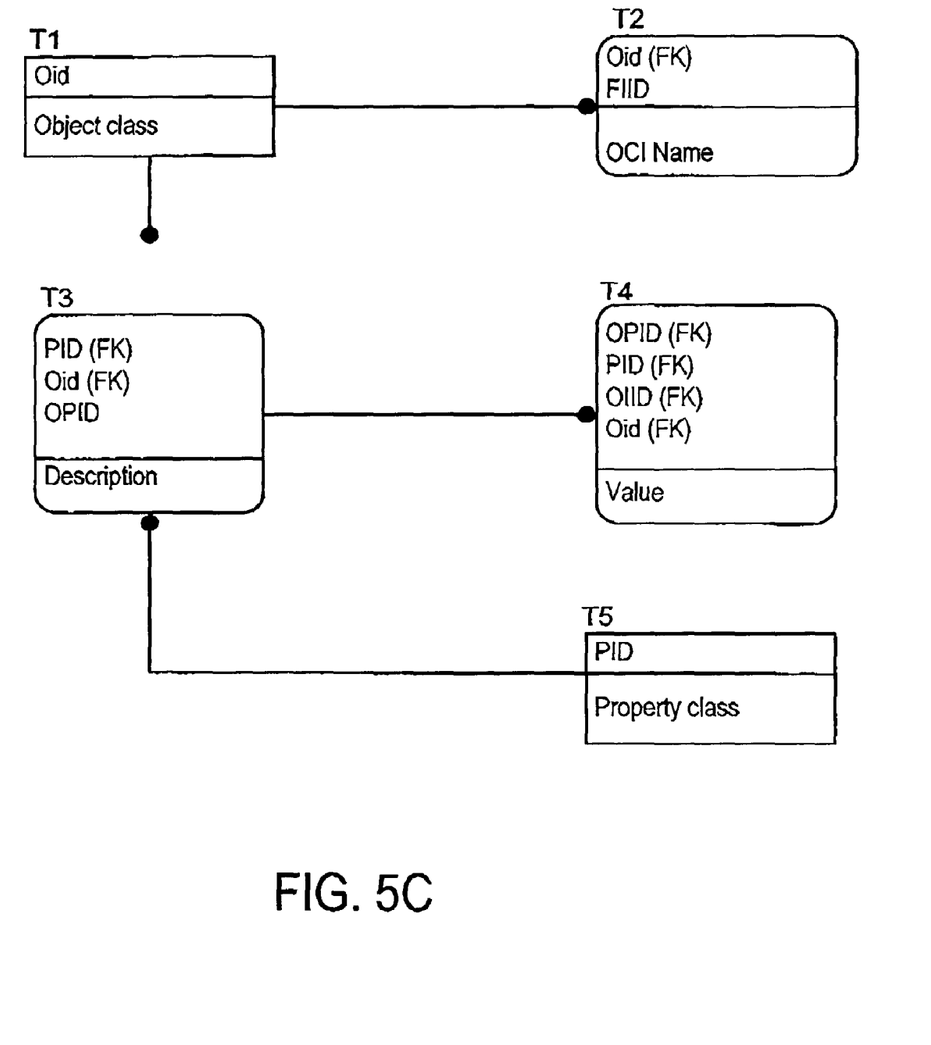
Figure 6:
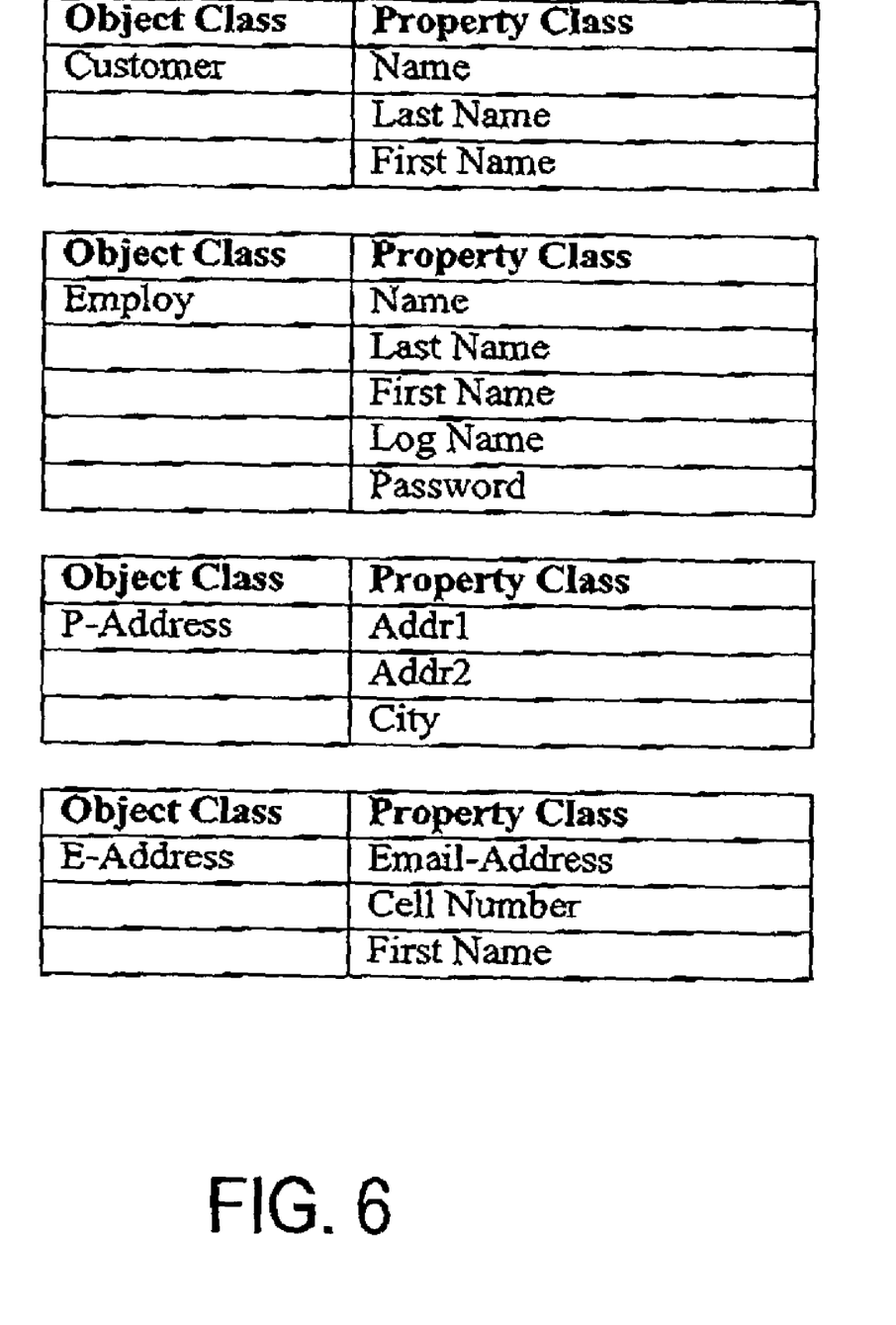
FIG. 6 shows a table defining the relationships between object classes and property classes for the example shown in FIGS. 5A, 5B and 5C.
Figure 7:
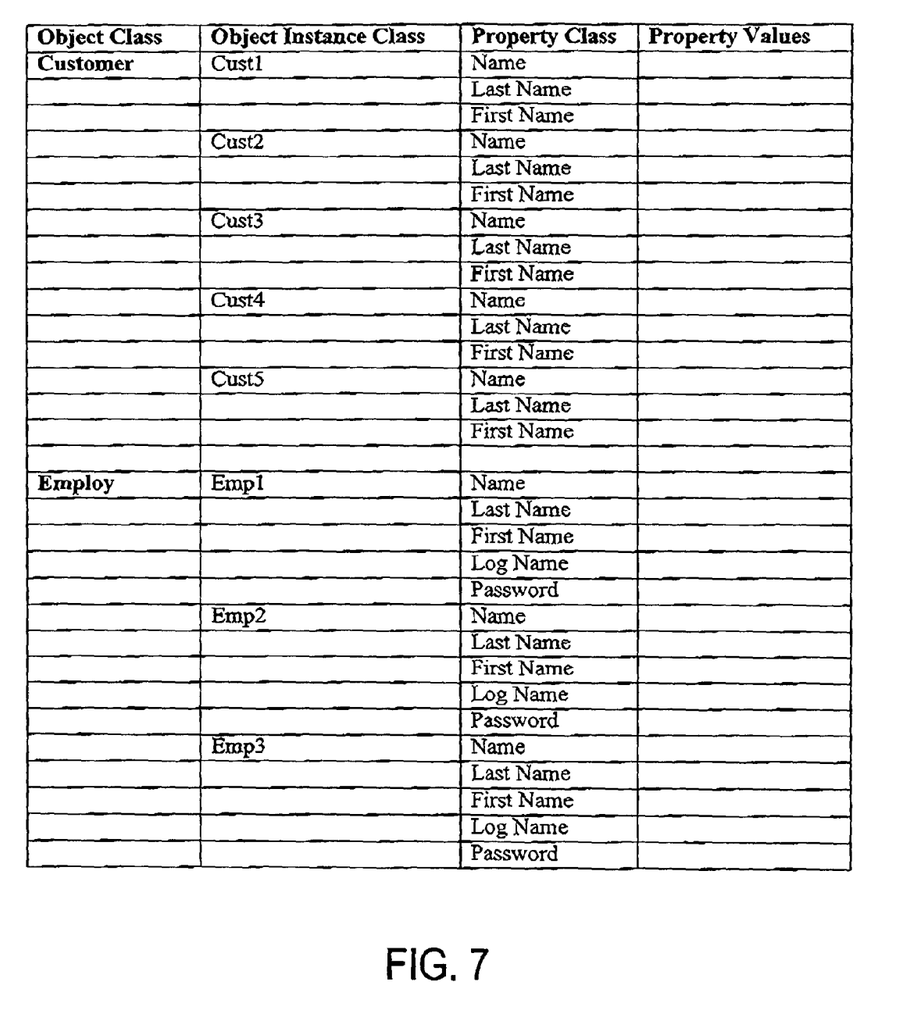
FIG. 7 shows a table defining, for each object instance, the value of each corresponding property class, for the example shown in FIGS. 5A, 5B and 5C.

For each defined property class, the following methods are defined:
    i. Create instances of property class
    ii. Update instances of property class
    iii. Delete instances of property class Similarly, for each defined object class, the following methods are defined:
    i. Create instances of object class
    ii. Update instances of object class
    iii. Delete instances of object class FIGS. 5A, 5B and 5C illustrates the data schema of the secondary data structure 28, according to this specific example of implementation. As seen in FIG. 5C, the secondary data structure 28 includes five tables, T1-T5, to match the defined classes and properties. T1 is a table listing all of the defined object classes, while T5 is a table listing all of the defined property classes. As shown in FIG. 6, T3 is a table defining the relationships between the defined object classes and the defined property classes. T2 is a table listing the different instances of the object classes and T4 is a table defining, for each object class instance, the value of each corresponding property class, as shown in FIG. 7.

A particular set of data access routines must also be defined, to be implemented by the secondary data access unit 34 for calling the methods of each defined property class and object class in order to customize the data relationships defined by tables T1-T5 of the secondary data structure 28. The following is one example of such a set of data access routines:

```
AddObjectClass(("ObjectClass")
(Insert ObjectClass into T1)
Add PropertyClass (("PropertyClass")
(Insert PropertyClass into T5)
AssociateOCPC(ObjectClass, PropertyClasses)
(
    Loop for number of PropertyClasses
        Insert ObjectClassID, PropertyClassesID into t3
    End loop
)
CreatPropertInstance(ObjectClass, ObjectClassInst,
PropertyClassesValues)
(
    Insert ObjectClassInst into T2
    Loop for number of PropertyClassesValues
        Insert ObjectClassID, PropertyClassesID, ObjectClassInstID,
        PropertyClassesValues into t4
    End loop
)
Get info("ObjectClassInst","PropertyClasses")
(
    Select values from T5 as a, T2 as b, T1 as c, T3 as d
    where a.oiid = b.oiid and c.oid = b.oid and d.opid = a.opid. etc....
)
```

Advantageously, using these data access routines, it is possible to:

Create any Property class
Create any Object class
Associate any Object class with any Property class
Create an Object class instance with Property class values Now, assume that information indicative of a new customer is input by a user for storage in the information management system 20. This inputted data will drive the secondary data structure 28 to create a new Object class instance in table T2 for this new customer, prompting the user for the associated Property class values in order to complete the Table T4. Thus, in this scenario, the tables T2 and T4 will be dynamically varied by the addition of one or more new rows for the new customer information. In a different scenario, a customer could be deleted from the database, such that the corresponding Object class instance in table T2 would be deleted, and at least one row from each table T2 and T4 would be deleted.

Although several embodiments have been illustrated, this was for the purpose of describing, but not limiting, the invention. Various modifications will become apparent to those skilled in the art and are within the scope of this invention, which is defined more particularly by the attached claims.

The invention claimed is:

1. A computer executable information management system for storing and retrieving data, comprising:
    a processor and a memory;
    a database architecture such that the system includes an application layer characterized by a first set of data processing rules as business logic, and at least one database management system (DBMS) implementing:
    a primary data structure, including a plurality of data elements for storing and retrieving data independent of the first set of data processing rules that no change is implemented in the primary data structure for any possible change in the first set of data processing rules such that said primary data structure characterized by a fixed data schema for changes in the business logic without modifying an actual physical data structure of the information management system when the data processing rules are changed to implement new requirements, wherein the fixed data schema contains at least one variable data schema such that only variable data schema is changed in the first set of data processing rules, wherein said primary data structure comprises a set of data elements required to create any number of secondary data structures within itself; and
    a second data structure contained in the primary data structure and defined by creating data and the second data structure's organization within the primary data structure for a first set of business rules such that said data and the second data structure's organization are changed dynamically only by changing the first set of business rules, and
    wherein the secondary data structure is characterized by dynamically variable data model or schema.

2. The information management system having a database architecture as defined in claim 1, wherein the data elements are selected from the group consisting of tables, data fields, memo fields, records, spreadsheets, data files, indexes and relationships.

3. The information management system having a database architecture as defined in claim 1, wherein said database architecture is an N-tier data model.

4. The information management system having a database architecture as defined in claim 1, wherein said data management system (DBMS) is a relational database management system and include one or more primary data structure.

* * * * *